United States Patent
Chabin et al.

(10) Patent No.: US 10,213,684 B2
(45) Date of Patent: Feb. 26, 2019

(54) DEVICE AND SYSTEM FOR GENERATING AND AUTOMATICALLY CONTROLLING A FORCE FOR MOVING A MOVEABLE ELEMENT LOCATED IN REAL TIME (71) Applicant: EPAWN, Paris (FR)

(72) Inventors: Laurent Chabin, Asnieres sur Seine (FR); Valentin Lefevre, Puteaux (FR); Christophe Duteil, Paris (FR)

(73) Assignee: STARBREEZE PARIS, Paris (FR)

( * ) Notice: Subject to any disclaimer, the term of this patent is extended or adjusted under 35 U.S.C. 154(b) by 612 days.

(21) Appl. No.: 14/782,679

(22) PCT Filed: Apr. 4, 2014

(86) PCT No.: PCT/FR2014/050820
§ 371 (c)(1),
(2) Date: Oct. 6, 2015

(87) PCT Pub. No.: WO2014/167229
PCT Pub. Date: Oct. 16, 2014

(65) Prior Publication Data
US 2016/0038832 A1 Feb. 11, 2016

(30) Foreign Application Priority Data

Apr. 8, 2013 (FR) .................................... 13 53137

(51) Int. Cl.
G06F 3/033 (2013.01)
A63F 13/235 (2014.01)
(Continued)

(52) U.S. Cl.
CPC ........ A63F 13/235 (2014.09); A63F 3/00643 (2013.01); A63F 13/00 (2013.01);
(Continued)

(58) Field of Classification Search
USPC .................................................. 446/431, 484
See application file for complete search history.

(56) References Cited

U.S. PATENT DOCUMENTS 9,322,653 B2* 4/2016 Sigal .................. G06K 9/00342
2004/0164696 A1 8/2004 Yourlo et al.
2005/0162389 A1* 7/2005 Obermeyer ............ G05G 9/047
345/161
2008/0238885 A1 10/2008 Zachut et al.
(Continued)

FOREIGN PATENT DOCUMENTS

GB         2 427 529 A      12/2006
WO      2012/028827 A1      3/2012

OTHER PUBLICATIONS

International Search Report, dated Sep. 25, 2014, from corresponding PCT application.

Primary Examiner — Masud Ahmed
(74) Attorney, Agent, or Firm — Young & Thompson (57) ABSTRACT A device for generating and automatically controlling a displacement force of a mobile entity located in real time includes elements for generating a force of movement, the elements being controllable so as to generate a force in a plurality of different directions. The device also includes: elements for receiving a radio signal; elements for transmitting an electromagnetic signal, the electromagnetic signal being transmitted in response to an activation signal and allowing a moveable entity including the device to be located in real time; and control elements connected to the reception elements and to the elements for transmitting an electromagnetic signal. The control elements are configured to control the elements for generating at least one force of movement, in response to information for controlling a received electromagnetic signal, and for generating an activation signal, in response to synchronization information of a received radio signal.

18 Claims, 5 Drawing Sheets (51) Int. Cl.
 *G06F 3/046* (2006.01)
 *A63F 13/00* (2014.01)
 *A63F 13/2145* (2014.01)
 *A63F 13/28* (2014.01)
 *A63F 13/98* (2014.01)
 *G06F 3/03* (2006.01)
 *A63F 3/00* (2006.01)
 *A63F 9/24* (2006.01)

(52) U.S. Cl.
 CPC .......... *A63F 13/2145* (2014.09); *A63F 13/28* (2014.09); *A63F 13/98* (2014.09); *G06F 3/03* (2013.01); *G06F 3/046* (2013.01); *A63F 2003/00668* (2013.01); *A63F 2009/2482* (2013.01); *A63F 2009/2486* (2013.01); *A63F 2009/2489* (2013.01)

(56) References Cited

U.S. PATENT DOCUMENTS

| | | |
|---|---|---|
| 2011/0076916 A1 | 3/2011 | Norman et al. |
| 2012/0232780 A1* | 9/2012 | Delson .................. A63F 13/06 701/400 |
| 2012/0235636 A1* | 9/2012 | Partovi .................. H02J 7/025 320/108 |
| 2012/0302128 A1 | 11/2012 | McClintock et al. |
| 2013/0157690 A1 | 6/2013 | Lefevre et al. |
| 2014/0107390 A1* | 4/2014 | Brown ................ A61N 5/1045 600/1 |
| 2014/0113828 A1* | 4/2014 | Gilbert ................ H01L 39/126 505/100 |
| 2014/0163664 A1* | 6/2014 | Goldsmith ....... A61B 17/00491 623/1.11 |
| 2015/0081110 A1* | 3/2015 | Houston ................ G05D 19/02 700/280 |

* cited by examiner

DEVICE AND SYSTEM FOR GENERATING AND AUTOMATICALLY CONTROLLING A FORCE FOR MOVING A MOVEABLE ELEMENT LOCATED IN REAL TIME

The present invention concerns the interfaces between a user and a computer system, in particular in the field of games, and more particularly a device and a system to generate and automatically control a force for displacing a mobile entity located in real time

BACKGROUND OF THE INVENTION

In numerous situations, it may be necessary to displace one or more mobile entities, manually or automatically, in liaison with a computer system, the latter preferably being capable of detecting the position and/or the orientation of those mobile entities.

Thus, for example, in a game utilizing figurines on a game board, enabling a user to play against a virtual player simulated by a computer system, the application implemented on the computer system must know the position of all the figurines of the game board, in particular those moved by the user, to calculate its move and make it possible to perform or indicate the displacements of the figurines.

There are solutions for detecting the position and/or the orientation of real objects on a game board making it possible to use those objects as an interface for a computer system.

Thus, for example, resistive type touch screens may be used as a game board in order to detect the position of an object such as a stylus when sufficient pressure is applied. However, this type of screen in general only supports a single contact and requires constant pressure by the user to know the position. In other words, it is not possible to detect the position of the stylus if the pressure applied by the latter is relaxed.

It is also possible to use capacitive type touch screens, based on the principle of a leakage of current through a conductive body. However, only objects that are conductive and linked to a ground enable the detection of their position. Thus, for example, the positions of objects of plastic or wood cannot be determined using such screens.

In general terms, the solutions based on touch screens, or touch film, only support a limited number of simultaneous or almost simultaneous touches and do not enable the determination of a high number of objects.

Other solutions implement technologies based on infrared, in particular in the form of tables. Thus, for example, the products known under the names Surface (Surface is a trademark of Microsoft), mTouch (mTouch is a trademark of Merel Technologies) and Entertaible (Entertaible is a trademark of Philips) use infrared cameras disposed within the thickness of the table. However, the required thickness of these tables makes them bulky and of low mobility and gives them a certain rigidity. Furthermore, their price does not really allow for family use.

Lastly, another solution developed by the Applicant enables real-time interfacing of a plurality of mobile entities with a computer system. After having selected at least one location module integrated in a mobile entity, this location module is activated sequentially. A signal is then received from this activated location module and information on position of the mobile entity comprising that activated location module is computed in real time from the received signal. The location modules are sequentially activated, a single location module being activated at a given time.

Furthermore, solutions exist for automatically displacing mobile entities from a first position to the second position. For these purposes, the mobile entities are typically provided with sensors and with motors actuating wheels. It is noted here that the use of motors to actuate wheels leads to a degree of precision of the movements. The sensors do not need to be very accurate.

To control the displacement of these mobile entities, PID type controllers may be used (PID standing for proportional-integral-derivative). It is to be recalled that a PID controller enables real-time computation of a difference between a real path of an mobile object and a desired path in order to adapt an actuator control to modify the direction of the object accordingly. These computations are generally carried out several times per second.

However, although such solutions may be satisfactory in certain conditions, they nevertheless have numerous drawbacks. To be precise, they are in particular often costly to implement and have mechanical weaknesses linked to the wear and clogging of the mechanism (for example tires, gear trains and wheel shafts).

The invention enables at least one of the problems set forth above to be solved.

SUMMARY OF THE INVENTION

The invention is thus directed to a device for generating and automatically controlling a displacement force of a mobile entity of which the position and the orientation are determined in real time, this device comprising the following means, means for generating at least one displacement force, said means for generating at least one displacement force being able to be controlled to generate a force in several different directions;

reception means for receiving a radio-frequency signal;

emission means for emitting an electromagnetic signal, said electromagnetic signal being emitted in response to an activation signal and enabling the real-time location of a mobile entity comprising said device;

control means connected to said reception means and to said emission means for emitting an electromagnetic signal, said control means being configured for controlling said means to generate at least one displacement force in response to control information from a received radio-frequency signal and generate an activation signal in response to synchronization information from a received radio-frequency signal.

On account of its structure not involving wheeled parts, the reliability of the device according to the invention is improved (absence of wear of wheels, tires and drive members such as gear trains and absence of clogging of the wheel shafts). Furthermore, the absence of drive members such as gear trains enables the noise emitted during displacements of the device to be limited.

According to a particular embodiment, said means for generating at least one displacement force comprise mechanical parts of vibrator type. The invention may thus be implemented by utilizing mass-produced parts of which the production cost is very low. Furthermore, such a mode of displacement gives an unreal and magical aspect to the displacement.

Said mechanical parts may in particular comprise at least one motor and at least one eccentric fly weight which is driven, directly or indirectly, by said at least one motor. The device may furthermore comprise at least one elastic and/or mobile stop, said at least one stop being mounted such that it is struck by said at least one fly weight at each revolution of said at least one fly weight.

According to a particular embodiment, said at least one motor has a rotation shaft substantially perpendicular to the plane of displacement of said device.

Still according to a particular embodiment, the device comprises two or four mechanical parts of vibrator type.

Still according to a particular embodiment, said reception means for receiving a radio-frequency signal comprise a dual-port memory, said dual-port memory being configured to be accessible for reading and/or writing by a radio-frequency signal and by said control means.

Still according to a particular embodiment, said receiving means for receiving a radio-frequency signal comprise identification means for identifying synchronization information and/or control information from a received radio-frequency signal and transmission means for transmitting identified synchronization information and/or identified control information to said control means.

According to a particular embodiment, said control means comprise means for accessing a value stored in said dual-port memory, synchronization and/or control information being identified according to a value stored in said dual-port memory.

Said reception means for receiving a radio-frequency signal are, for example, in accordance with an RFID type standard.

The invention is also directed to a system for automatically controlling a displacement force of a mobile entity of which the position and the orientation are determined in real time, this system comprising the following means:
    at least one mobile entity comprising a device as described above for generating and automatically controlling a displacement force of a mobile entity; and
    a sensing surface comprising:
        position detection driver means for sequentially activating electromagnetic emissions of mobile entities;
        location means for locating an electromagnetic signal; and
        control driver means for emitting control information making it possible to control said means for generating at least one displacement force of said device of said at least one mobile entity.

On account of the structure of the mobile entity not involving wheeled parts, the reliability of the device according to the invention is improved (absence of wear of wheels, tires and drive members such as gear trains and absence of clogging of the wheel shafts). Furthermore, the absence of drive members such as gear trains enables the noise emitted during displacements of the device to be limited.

According to a particular embodiment, said at least one displacement force of said device of said at least one mobile entity is determined in response to location information of said at least one mobile entity determined by said location means.

Still according to a particular embodiment, said control driver means comprise means for computing an error between a real path of said at least one mobile entity and a desired path of said at least one mobile entity.

Said control driver means comprise, for example, a PID type controller.

BRIEF DESCRIPTION OF THE DRAWINGS

Other advantages, objects and features of the present invention will emerge from the following detailed description, given by way of non-limiting example, relative to the accompanying drawings in which:

FIG. 6, comprising

FIG. 9, comprising FIGS. 9a to 9c, represents a mechanical part of vibrator type capable of being integrated into a mobile entity and comprising a motor, an eccentric fly weight driven by the motor and an elastic and/or mobile vertical stop.

DETAILED DESCRIPTION OF THE PREFERRED EMBODIMENTS

In general terms, the invention relates to a mobile entity of which the position (x-coordinate, y-coordinate, altitude) and/or the orientation (yaw, pitch and/or roll) may be determined by a detection surface and comprising mechanical parts, preferably of vibrator type, which may be activated independently. The detection surface is capable of sequentially determining the position and/or the orientation of a set of mobile entities.

For these purposes, each mobile entity is provided here with at least one activation module capable of receiving an activation signal and a control signal, a location module and a module for generating the displacement forces. The location module is controlled, directly or indirectly, by an activation signal received by the activation module. Similarly, the module for generating displacement forces is controlled, directly or indirectly, by a control signal received by the activation module. Already at this stage, it can be noted that an activation signal may be a control signal.

The position may be a two-dimensional position, in a plane, or a three-dimensional position comprising an altitude (or elevation). The detection surface may be combined with a screen to provide, for example, items of decor or information.

By way of illustration, the sensing of three-dimensional positions of mobile entities may be made by an electromagnetic field. For these purposes, a detection surface for detecting positions of the mobile entities, composed of a mesh of row/column electromagnetic sensing type, is used. It is associated with an electronic module capable of computing, by demultiplexing, the position of a location module emitting an electromagnetic field.

Each location module is thus selected sequentially, for example according to an identifier specific to it, in order for it to emit an electromagnetic field. For these purposes, each location module comprises an activation mechanism such that, when it is activated, it emits an electromagnetic field able to be sensed by the detection surface.

A position detection driver module is associated with the detection surface in order to sequentially activate the electromagnetic emissions of the location modules via an activation signal or to control such sequential activation. The activation signal between this module and the location modules is advantageously transmitted via wireless connections.

The activation signal may concern each location module selectively, for example according to their identifiers, or a set of location modules which are then sequentially activated according to delay mechanisms integrated in those modules, enabling an activation after a predetermined period following the reception of an activation signal.

Furthermore, a control driver module is associated with the detection surface in order to emit a signal enabling control of a module to generate displacement forces of one or of several mechanical parts, preferably of vibrator type, belonging to the mobile entity. The addressee of a control signal may be specified in the control signal itself. Thus, a control signal may in particular comprise a mobile entity identifier, a location module identifier and/or an identifier of a mechanical part, preferably of vibrator type, of a mobile entity.

The control driver module may be integrated into the position detection driver module. In simplified manner, this module uses the position and orientation of a mobile entity to control mechanical parts, preferably of vibrator type, integrated into that mobile entity (by controlling for example a direction and speed of rotation of motors integrated into those mechanical parts).

The orientation of the mobile entity may in particular be obtained by the use of several location modules in the mobile entity. These orientation and position data enable automatic position control (path control) using, for example, a feedback loop of a PID type controller.

According to a particular embodiment, the electronics for activation, location and control of the mobile entities is at least partially electrically supplied by induction, the antenna used to capture the energy also being used to activate and synchronize the mobile entity, that is to say enable a communication between the location surface and a mobile entity. The supply by induction, implementing inductive coupling, may use specific control circuits or standard circuits, for example circuits in accordance with the RFID standards (RFID standing for Radio Frequency IDentification) or in accordance with the QI recommendations (developed by the "Wireless Power Consortium") such as the circuits bearing the references BQ500110 and BQ5101x developed by the company Texas Instruments.

Still according to a particular embodiment, the electronics for activation, location and control of the mobile entities is at least partially electrically supplied by an electrical source such as a cell or a battery. Such a battery may be at least partially charged by induction, in particular by induction using the antenna used to activate and synchronize the mobile entity. As described above, the supply by induction, implementing inductive coupling, may use specific control circuits or standard circuits, for example circuits in accordance with the RFID standards or with the QI recommendations.

It is observed here that when the activation and location electronics is supplied by cell or battery, it may use just a radio receiver.

The positions detection surface is, for example, a PCB type board (PCB standing for Printed Circuit Board) for electromagnetic reception, which may be flexible or rigid. It may be associated with a screen, also flexible or rigid, touch-sensitive or not touch-sensitive, for example an LCD type screen (LCD standing for Liquid Crystal Display) or OLED (acronym for Organic Light-Emitting Diode) enabling the mobile entities to move over an interactive visual surface. The detection surface may also be associated with a magnetized surface enabling the mobile entities to be moved over a plane that is inclined, vertical or inverted (face down) or subjected to shocks, without altering the position detection.

Figure 1:
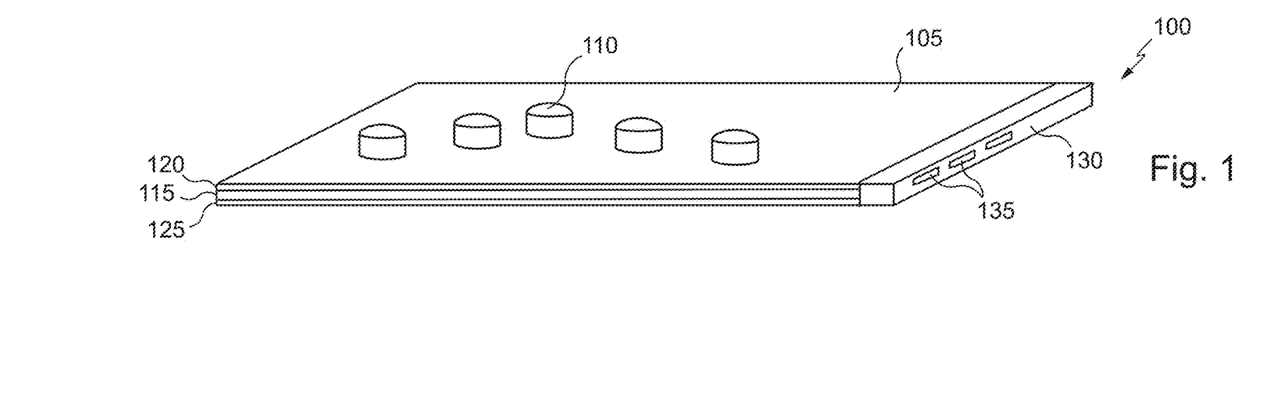
FIG. 1 diagrammatically illustrates an example of architecture capable of being used to implement the invention.

FIG. 1 diagrammatically illustrates an example of architecture 100 capable of being used to implement the invention.

The architecture 100 here comprises a board 105, for example a game board, on which are disposed mobile entities 110 enabling a user to interact with a computer system associated with that board by displacing the mobile entities 110, it also being possible for these latter to be displaced autonomously. Although only five mobile entities are represented here, it is possible to use several tens of them, or even several hundreds. The board 105 defines the zone of position and/or orientation detection of the mobile entities deployed.

The board 105 here comprises a detection surface 115 coupled to a screen 120 and to a magnetized surface 125 (the detection surface 115, the screen 120 and the magnetized surface 125 are substantially parallel here). It also comprises a hardware module 130 (or control processing system) for detecting the position and, if necessary, the orientation of the mobile entities 110 as well as to implement one or more applications with which the user interacts and to control the displacement of mobile entities.

The hardware module 130 is in particular in charge of managing the detections of the positions and/or orientations of the mobile entities, that is to say to identify the location modules one after the other, to activate them so that they emit, each in turn, an electromagnetic field, to evaluate their positions and compute commands to control the displacement of the mobile entities.

The hardware module 130 is preferably inserted into a shell with the other components of the board 105. Alternatively, it may be a remote module integrated, for example, in a computer or games console. It may be electrically powered by a rechargeable battery or via a mains adaptor and have a set of conventional connections 135, for example an electrical plug for a mains adaptor, and ports for USB, Ethernet, VGA video (VGA standing for Video Graphics Array) and/or HDMI (standing for High Definition Multimedia In), where appropriate, in particular if a screen is associated with the detection zone. It furthermore comprises, preferably a wireless communication module, for example a wireless communication module of WIFI or Bluetooth type enabling interaction with another computer system and/or access to data via a communication network.

The hardware module 130 typically comprises a computing module, a module for detection driving and position sensing and control driving module detailed below. The computing module is provided here with a central processing unit (or CPU), a graphics processing unit (or GPU), memory components (RAM, standing for Random Access Memory, ROM, standing for Read Only Memory and/or memory of Flash type) to store the programs and the variables necessary for the implementation of the invention as well as an audio processing module, in the form, for example, of a chipset.

According to a particular embodiment, the hardware module 130 is not integrated into the board 105 but is linked to it. It is for example a portable computer of PC type or a device such as a smartphone or a tablet connected to the board 105.

The driver module for position sensing and detection sequentially activates, for example by radio, each location module of which the position is to be determined or controls such a sequential activation. After activation, each location module here emits an electromagnetic field sensed by the detection surface. The latter then transmits, to the position sensing and detection module, information enabling computation of the position of a location module, for example of (x, y, z) type. As described below, when several location modules are associated with the same mobile device, it is possible, based on the positions of those location modules, to determine orientation parameters of that mobile device, for example in the form of angles. The positions and/or orientation of all the mobile entities of which the position and/or orientation are to be determined are then sent to the computing module which uses them to manage the interactivity with the application considered.

The board 105 and the associated electronics are called sensing surface in the following description.

Figure 2:
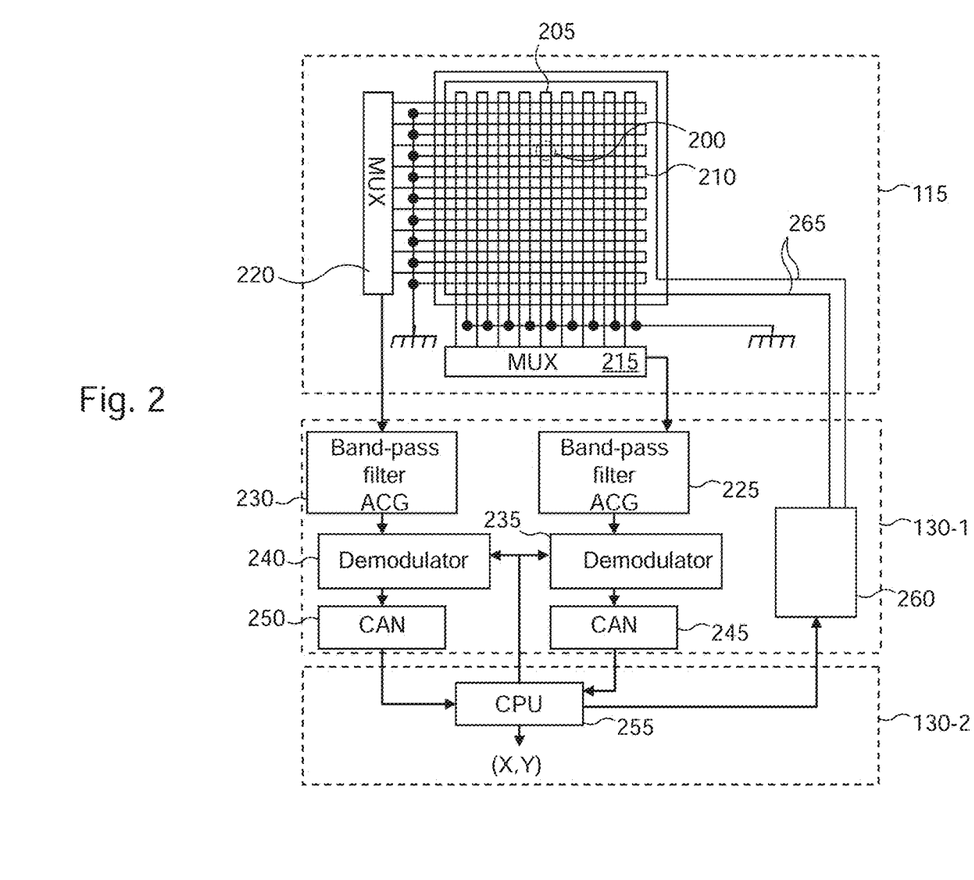
FIG. 2 illustrates an example of a detection surface and of associated logic for determining the position and the orientation of a mobile entity.

FIG. 2 illustrates an example of a detection surface and of associated logic.

The detection surface 115 is here constituted by a mesh in the form of rows and columns constituting a conductive grid. The latter comprises a set of conductive loops along two orthogonal axes. Each loop is a discreet sensor making it possible to measure the intensity of the current or the voltage induced by a radiating element, typically a solenoid belonging to a mobile entity of which the position and/or the orientation are to be computed, which is positioned on the detection surface.

By way of illustration, it is assumed here that a solenoid is placed in position 200, that is to say at the intersection of the loops 205 and 210 of which one end is connected to a ground and the other end is connected to the electronic components used to compute a position. When the solenoid situated at position 200 is powered, it generates an inductive current in the loops 205 and 210 which may be analyzed and compared with the current induced in the other loops. It is thus possible, by inductive coupling between the solenoid and the grid and by measurement of the induced current, to determine the position of the solenoid.

Multiplexers 215 and 220 are connected to each loop of each of the two axes of the grid, that is to say here to each of the vertical and horizontal loops, respectively. The outputs from the multiplexers 215 and 220 are connected to the automatic gain controllers (AGCs) 225 and 230, respectively, of the driver module for position sensing and detection, here referenced 130-1, of the hardware module. The output signals from the automatic gain controllers 225 and 230 are first of all demodulated in the demodulators 235 and 240, respectively. The demodulation produces a direct current (or DC) signal proportional to the original sinusoid made up with alternating current (or AC) components that are multiples of the fixed frequency emitted by the solenoid.

According to a commonly used configuration, the computing module, here referenced 130-2, of the detection module 130 drives the multiplexers 215 and 220 in order to sequentially activate the loops, that is to say to activate a loop n+1 after a loop n. When the last loop has been reached, the processor initiates a new cycle and controls the activation of the first loop.

A band-pass filter is advantageously employed in each automatic gain controller 225 and 230 to eliminate the undesirable harmonics from the demodulated signal as well as the electromagnetic background noise. This filtering makes it possible to refine the measurements of the signals coming from the multiplexers 215 and 220, which are demodulated in the demodulators 235 and 240 then digitized in the digital/analog converters (DACs) 245 and 250, respectively.

The digital values obtained are sent to the central processing unit (CPU) 255 of the computing module 130-2 to be stored in memory. As illustrated, the central processing unit 255 controls the demodulators 235 and 240.

After the values have been stored in memory, the central processing unit increments the address of the multiplexers in order to carry out the digitization of the signals coming from the following loops. When a last loop has been attained, the central processing unit reinitializes the address of the multiplexer corresponding to the value of the first loop of the axis considered.

At the end of a cycle, the central processing unit has stored in memory, for each axis, the same number of digital values as there are adjacent loops close to the position of the solenoid. Based on these values, the central processing unit computes the position of the solenoid by interpolation as described below.

It is to be noted here that the ground connection of the loops may be provided by strips of metal positioned between the different loops in order to protect them from electromagnetic interference. An alternative consists of disposing a uniform ground plane under the conductive grid.

Furthermore, the driver module for position sensing and detection 130-1 here comprising the control driver module, integrates an emitter 260, controlled by the central processing unit 255 of the computing module 130-2, enabling a location module of a mobile entity to be activated.

By way of illustration, the central processing unit 255 sends to the emitter 260 an identifier of a location module to activate. This identifier is coded then sent in the form of a digital or analog radio signal. Each location module receiving this signal may then compare the identifier received with its own identifier and activate itself if the identifiers are identical. Alternatively, the central processing unit 255 sends to the emitter 260 a general activation signal which is coded then sent in the form of a digital or analog radio signal.

In similar manner, the central processing unit 255 sends to the emitter 260 at least one identifier of a mobile entity, location module and/or mechanical part, preferably of vibrator type, with a module control command to generate forces for displacement of one or more mechanical parts, preferably of vibrator type. This or these identifiers as well as this command are preferably coded then transmitted in the form of a digital or analog radio signal. Each location module receiving this signal may then determine, based on the identifier or identifiers received, whether the received command concerns it.

The emitter 260 is linked to an antenna 265 enabling the transmission of activation and control signals here used by the mobile entities as energy source, to activate the location modules and to generate displacement forces of one or more mechanical parts, preferably of vibrator type. The antenna 265 is advantageously placed on the detection surface 115, for example around the loops 205 and 210. According to a particular embodiment, the loops 205 and 210 may also be used to form the antenna 265. For these purposes, a switch is used to determine the emitting or receiving function of the loops 205 and 210 (these latter are then, according to the position of the switch, linked to the multiplexers 215 and 220 or to the emitter 260).

As described below, the emitter 260 may in particular comprise a reader of RFID type.

Thus, to estimate the position of a set of location modules, it is necessary to sequentially activate each location module and, for each of these activations, according to the embodiment described here, to perform a cycle is carried on each set of loops.

Several detection surfaces may be combined with each other, the resulting area of the detection surface being the sum of the areas of the detection surfaces combined. For these purposes, one detection surface is considered as "master", the others being considered as slaves. The sequential activation of the mobile entities is managed by the master detection surface which preferably receives the positions computed by the hardware modules associated with each slave detection surface and consolidates them by producing a table containing the coordinates and angles of freedom of the location modules.

Figure 3:
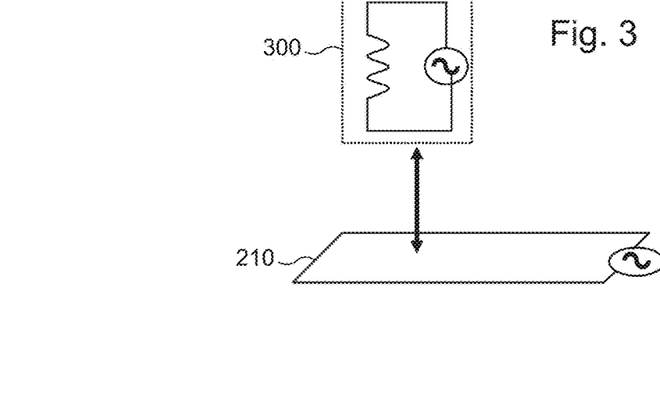
FIG. 3 diagrammatically illustrates the physical principle of inductive coupling between a solenoid and a conductive loop of a detection surface.

FIG. 3 diagrammatically illustrates the physical principle of inductive coupling between a solenoid and a conducting loop of a detection surface.

Each mobile entity of which the position and/or the orientation are to be computed comprises at least one solenoid of which the axis is, preferably, oriented towards the detection surface.

The solenoid 300 is passed through by an alternating current and emits an electromagnetic field which propagates towards the detection surface, in particular, in this example, towards the loop 210. The loop 210, receiving an electromagnetic field coming from the solenoid 300, couples with the solenoid 300. It is then possible to measure an alternating current signal at the terminals of that loop, referenced 305.

The coupling between the solenoid 300 and the loop 210 may be expressed in the form of the following relationship, $$R = \frac{k}{D^2} E$$

where

E designates the voltage at the terminals of the solenoid 300, R designates the voltage of the signal received at the terminals 305 of the receiving loop 210, D is the distance between the solenoid 300 and the receiving loop 210 and k is a constant linked to intrinsic factors of the system comprising the solenoid and the receiving loop, in particular the number of turns of the solenoid and the size of the loop.

Figure 4:
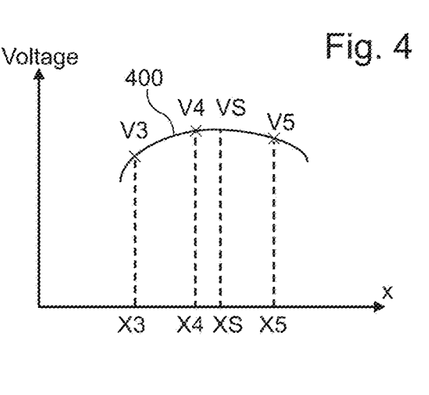
FIG. 4 diagrammatically illustrates an interpolation mechanism making it possible to compute the position of a solenoid placed on a detection surface, along a given axis, based on measurements obtained by a system such as that described with reference to FIG. 2.

FIG. 4 diagrammatically illustrates an interpolation mechanism making it possible to compute the position of a solenoid placed on a detection surface, according to a given axis, based on the measurements obtained by a system such as that described with reference to FIG. 2.

It is assumed here that the solenoid is situated in the vicinity of vertical loops B3, B4 and B5, positioned according to the x-coordinates X3, X4 and X5, the voltages measured at the terminals of the loops being denoted V3, V4 and V5, respectively. The solenoid is to be found here at a position, along the x-axis, denoted XS.

The coordinates X3, X4 and X5 may be obtained by the central processing unit from an identifier of the corresponding loop (these values are predefined according to the routing diagram of the detection surface and, preferably, are stored in a non-volatile memory).

The portion of curve 400 represented in FIG. 4 illustrates the variation in voltage for the position XS of the solenoid according to the positions of the loops coupled with the solenoid, extrapolated from the values measured by the loops B3, B4 and B5. It may be assimilated to a quadratic function of parabolic type. This local approximation corresponds, in practice, to the phenomenon of electromagnetic coupling between a solenoid and loops of a conductive grid.

The following relationships illustrate this property.

$$V3 = a(X3 - XS)^2 + b$$

$$V4 = a(X4 - XS)^2 + b$$

$$V5 = a(X5 - XS)^2 + b$$

in which a and b are constants, a being a constant less than zero (a<0).

Furthermore, given the assumption of a quadratic function, the relationships between the x-coordinates X3, X4 and X5 may be expressed in the following form, $$X4 - X3 = X5 - X4 = \Delta X$$

$$X5 - X3 = 2\Delta X$$

($\Delta X$ representing the distance between the x-coordinates X3 and X4 and between the x-coordinates X4 and X5).

It is thus possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid according to the y-axis.

Furthermore, the distance between the solenoid and the loop (that is to say the altitude of the solenoid relative to the detection surface) may be defined according to the following relationship, $$D = \sqrt{\frac{k}{R} E}$$

The distance D is thus a function of the value R representing the voltage at the terminals of the loops considered of the detection surface. It may be extrapolated from the measurements made. It is to be noted that the accuracy of this distance computation is in particular linked to the stability of the signal E emitted by the solenoid of which the value must be as constant as possible over time, which requires a stabilized supply in the location module which must not drop as the battery discharges. This may be ensured by a voltage regulator of the location module.

As indicated previously, the electronics for activation, location and control of the mobile entities may be electrically supplied by induction, the antenna used to capture the energy also being used to activate, synchronize and control the mobile entity. According to a particular embodiment, the supply of the modules for location and control of the mobile entities is made by a remote powering module of a circuit of RFID type. The use of an RFID type technology may thus be employed to supply and activate location modules as well as to supply and control modules for generating displacement forces of one or more mechanical parts, preferably of vibrator type.

For these purposes, the emitter 260 represented in FIG. 2 (or more generally the position detection driver module and the control driver module) uses a reader of RFID reader type enabling a mode of communication and synchronization of the location module via the RFID technology. The communications may then be made by operations of reading and writing in a non-volatile memory of an RFID type circuit carried by the mobile entities. Such memories are advantageously accessible by the sensing surface by RFID type accesses as well as by microcontrollers carried in the mobile entities by direct electrical links. A synchronization may in particular be made by a specific modulation of the amplitude of the RFID carrier.

Thus, According to a particular embodiment, the electronics of the sensing surface comprises an RFID type reader, that is to say a system enabling reading or writing access to components of RFID type, or RFID tags, situated near the sensing surface. These electronics here comprise at least one conductive coil covering the whole of or part of the sensing surface, used as RFID emitter/receiver antenna.

The average magnetic power emitted by the RFID antenna of the sensing surface is of a level such that it enables remote powering by magnetic induction of the electronics of the mobile entities situated in the immediate vicinity of the RFID antenna.

It is to be noted here that the RFID reader and the mobile entities may exploit one of the numerous RFID standards and their derivatives such as the standards ISO/IEC 15693, ISO 18000-3, ISO 18000-4, ISO 18000-7, ISO/IEC 14443, ISO/IEC 18092 (better known under the name of NFC, standing for Near Field Communication), ISO/IEC 21481 (also known under the name of NFC).

The central processing unit used to control the sensing surface, for example the central processing unit 255, is also used here to control the RFID reader. It may also temporaly control the activation and the deactivation of the production of the electromagnetic field for remote powering in phase with a cycle of duration $T_1$ of a common synchronization signal.

According to a particular embodiment, at least some of the mobile entities contain a non-volatile dual-port memory. This latter is accessible here by an RFID type reader, via wireless communication, and also by a local microcontroller, via a wired connection, for example a connection in accordance with the $I^2C$ bus standard ($I^2C$ standing for Inter Integrated Circuit). While this dual-port memory may be used to trigger the activation of a mobile entity and thus enable its location, it may also be used for other purposes by providing a particular means for communication between a mobile entity and the sensing surface in particular to control a module for generating displacement forces of one or more mechanical parts, preferably of vibrator type.

Advantageously, the dual-port memory of a mobile entity is accessible in reading and writing by the RFID type reader of the sensing surface. It forms a communication means between the logic of the sensing surface and a microcontroller carried in a mobile entity. The microcontroller is, preferably, altered to each reading and writing request received via the wireless communication protocol. Further to the reception of an indication of reception of a request, the microcontroller may interrogate that memory to determine whether such a request is addressed to it, the access type (writing or reading access) and the memory address concerned by the access request.

Furthermore, each mobile entity contains, in non-volatile memory, a unique identifier which is stored, for example, over 64 bits. According to a particular embodiment, this unique identifier is that known under the name of UID (standing for Unique IDentifier) of an electronic component accessible using an RFID type reader. Such an identifier may in particular be in accordance with a standard such as the ISO 15693, ISO 18000-3 and ISO14443 standards. Thus, an RFID type reader makes it possible for the computer system linked to the sensing surface to detect the arrival of new mobile entities and to identify them in unique manner by their identifier.

As described below, the logic associated with the sensing surface may determine and allocate a time out value to each detected location module. A time out value here represents a period of time after which a location module must emit a location signal further to the detection of a synchronization signal. The time out value allocated to a newly detected location module may be a free time out value (previously allocated to a location module which is no longer detected).

For these purposes, the RFID type reader may address the determined time out value to a dual-port memory of a location module in a writing request. By way of illustration, a computer system associated with the sensing surface may interrogate a database, local or remote, with the identifier of the location module as access key. Such a database advantageously makes it possible to obtain the list of the functional characteristics of the mobile entity. Thus, for example, this database may be used to determine whether the mobile entity comprising the location module considered has motors, actuators, display devices, sound production devices, sensors and/or switches. The list of the functionalities obtained may in particular be used to determine the nature of exchanges of commands and data that are possible between the computer system and the mobile entity.

The dual-port memory and the non-volatile memory used to store a location module identifier are, preferably, integrated with a remote powering module within the same component. Such components are available. Thus, for example, the company ST Micro Electronics manufactures a component under the reference M24LR16E which provides dual-port functions, of wireless interfacing and energy recovery.

In a mobile entity, such a circuit is advantageously linked to a microcontroller by an I2C type bus.

Furthermore, each mobile entity comprises one or more resonant circuits as well as at least one switch to enable the emission of location signals. The switch is advantageously controlled by the microcontroller which thus triggers the resonating or stopping of resonating enabling the location of the corresponding location module. It is to be noted here that the use of two resonant circuits enables a mobile entity to be located and to determine the orientation thereof. A single resonant circuit may be used if, alone, the position of the mobile entity is to be determined. Alternatively, more than two resonant circuits may be used, in particular to improve the estimation of the position and/or the orientation of the mobile entity.

Figure 5:
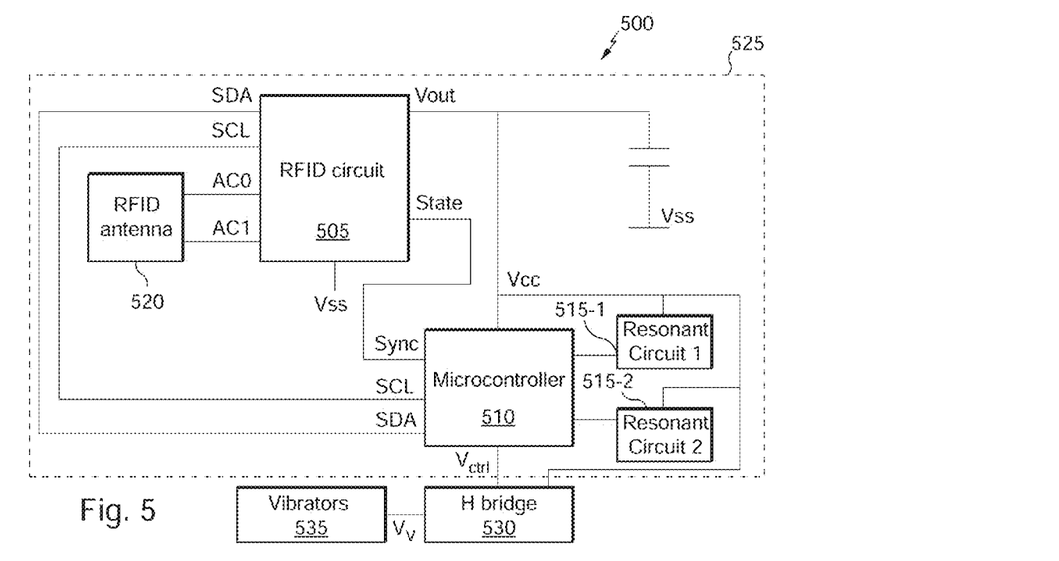
FIG. 5 illustrates a particular example of mobile entity electronic circuits, enabling their location.

FIG. 5 illustrates a particular example of an electronic circuit 500 of a mobile entity. As illustrated, the circuit 500 comprises a standard component 505 providing functions of RFID type by integrating a dual-port memory called an RFID chip, a microcontroller 510 and two resonant circuits 515-1 and 515-2, generically referenced 515. The circuit 500 also comprises an antenna 520 of RFID type adapted to the characteristics of the circuit 505. The antenna 520 is typically a coil linked to the circuit 505 via two links called AC0 and AC1 (AC standing for antenna coil).

According to this embodiment, two resonant circuits are implemented, sequentially, to enable the position and orientation of the mobile entity to be determined. In other words, the mobile entity here comprises two location modules, these location modules having a part in common (basically comprising the RFID circuit, the RFID antenna and the microcontroller) and distinct parts (basically comprising the resonant circuits).

The RFID circuit 505 is connected here to the microcontroller 510 by a bus of I2C type comprising a serial link for a clock signal called SCL (for Serial CLock) and a serial link to send data called SDA (for Serial Data). The electrical supply terminal of microcontroller 510, here denoted Vcc, like that of the resonant circuits 515-1 and 515-2, is connected to the terminal of the RFID circuit 505 delivering a voltage, here denoted Vout. In a conventional manner, the terminal of the RFID circuit 505 delivering a voltage is linked to a reference terminal denoted Vss by a capacitor enabling electrical peaks to be absorbed.

Furthermore, the synchronization signal of the microcontroller, used to control the triggering or stopping of the resonance (enabling the location of the mobile entity) is connected to a state terminal of the RFID circuit, denoted state here.

As the RFID circuit 505 is linked to the RFID antenna 520, it can receive electrical energy from an RFID reader and exchange data with the reader, according to reading and writing requests, in particular to update its memory. As the output Vout of the RFID circuit 505 is linked to the supply terminals Vcc of the microcontroller 510 and of the resonant circuits 515-1 and 515-2, these circuits may be electrically supplied and used.

According to a particular example, the state terminal of the RFID circuit 505 indicates, by a first logic state, for example the value 1, that the RFID circuit is receiving and processing a reading or writing request, or, more generally, that it is performing a predetermined task. In the opposite case, the state terminal of the RFID circuit 505 is in a second logic state, for example the value 0. Thus, on account of the connection of the synchronization terminal of the microcontroller 510 to the state terminal of the RFID circuit 505, one of the resonant circuits 515-1 or 515-2 may be activated by the microcontroller 510, immediately or on a differed basis, according to a state of the RFID circuit 505. In other words, a resonance and thus an electromagnetic emission is triggered (after a predetermined time which may be zero) when the state terminal of the RFID circuit 505 is in the first logic state and stopped (also after a predetermined time which may be zero) when the state terminal of the RFID circuit 505 is in the second logic state. In other words, the RFID circuit 505 has the task of controlling the triggering or the stopping of the resonance (enabling the location of the mobile entity).

It is to be noted here that the activation of the resonant circuits may, for example, be carried out sequentially according to a predetermined time offset (one of the resonant circuits may be activated after a first predetermined delay following the synchronization signal and the other resonant circuit may be activated after a second predetermined delay after the synchronization signal.

The group of circuits 505 to 520 and their connections forms a command and location tag 525.

Furthermore, the microcontroller 510 is connected, via a circuit 530 for reception of commands and for control of mechanical parts, to a module 535 for generating displacement forces. As described below, the module 535 typically comprises 2 or 4 mechanical parts, preferably of vibrator type. According to the described embodiment, the circuit 530 for reception of commands and for control of mechanical parts comprises an H bridge which receives a control signal Vctrl of PWM type (PWM standing for Pulse Width Modulation) and the electrical supply Vcc. As illustrated, the output of the circuit 530 for reception of commands and control of mechanical parts is a variable electrical supply Vv which controls the module 535 (each mechanical part here being controlled by a separate variable electrical supply, that is to say by its own H bridge). The circuit 530 for reception of commands and control of mechanical parts thus makes it possible, in particular, to control a direction and a speed of rotation of a motor.

The mechanical elements of the module 535 comprise, for example, a motor and a fly weight eccentrically mounted on the motor shaft (or on a shaft actuated by the motor) in order to enable, on rotation of the motor, the generation of a force in a plane perpendicular to the rotational axis. The direction of rotation of the motor may, preferably, be controlled. Such a part typically enables an acceleration of 1G to be generated for a motor of less than one gram.

Advantageously, an elastic and/or mobile vertical stop is placed on the path of the fly weight such that it is struck by the latter on each revolution. The instantaneous force produced at the moment of the impacts of the fly weight on the vertical stop enables a displacement force to be generated in a particular direction.

These mechanical parts may also be based on piezoelectric technology, the piezo quartz providing vibrations and, by incidence, a displacement force.

According to another embodiment, two wheels flush with the inner surface, which is preferably slippery, of the mobile entity are used. These separately controlled wheels are advantageously aligned on the same axis forming a diagonal of the mobile entity and at equal distance from its center. It is thus possible to spin the mobile entity (by actuating the wheels in different directions) and make it follow some path or other. Each of these wheels may be controlled by a motor itself controlled by a circuit comprising an H bridge as described above. More than two wheels may be used.

According to another embodiment, the synchronization of the microcontroller is carried out by the output Vout of the RFID circuit. Thus, when the RFID reader provides energy to the mobile entity, the output Vout from the RFID circuit provides a control voltage which is to be found at the input Sync of the microcontroller. This control voltage represents a first logic state. Conversely, when the output Vout passes to high impedance when the RFID reader no longer supplies energy to the mobile entity, the input state Sync of the microcontroller passes to 0 Volts thanks to the resistor for pull-down to ground and thanks to the diode which prevents the return of current, representing a second logic state. The first and second logic states enable the synchronization of the microcontroller. According to this embodiment, it is the software application running on the RFID reader that has the task of generating a remote powering signal and of activating that signal when it is desired to synchronize the microcontrollers of the mobile entities.

According to another embodiment, the synchronization of the microcontroller is carried out via the reading, here on the I2C bus, of a synchronization bit of which the change of state enables the synchronization to be activated. Such a synchronization bit advantageously has a predetermined address.

The software application running on the RFID reader has the task of generating the change of state of the synchronization bit in the memory of the RFID circuit.

Each mobile entity here comprises at least one solenoid associated with a capacitor, in parallel, to form at least one resonant circuit having the task of emitting a location signal. This resonant circuit is stimulated here by a microcontroller embedded in the mobile entity.

According to a particular embodiment, the microcontroller situated in the mobile entity stimulates a resonant circuit by one of its outputs configured to generate a pulse-width modulated cyclical signal at a frequency close to the natural frequency of the resonant circuit. The control of the cyclic ratio results in modulating the power emitted by the location module.

Recent microcontrollers have circuits enabling pulse-width modulated signals to be generated. The use of this hardware functionality enables the microcontroller to freely execute instructions of software code during the generation of the signal. Thus, the microcontroller can implement other functions and perform computations without disturbing the timing of the pulse width modulated signal.

It is observed here that the modulation of the power emitted by the resonant circuits of the location modules makes it possible to encode a bitstream corresponding to data to transfer to a computer system linked to the location surface. Knowing the amplitude A1 corresponding to the low state and the amplitude A2 corresponding to the high state of a location signal, it is possible to use an NRZ type modulation (NRZ standing for Non Return to Zero) which enables the sensing surface to discriminate the amplitude variations associated with a data transfer, from those which are due to all the causes which may produce a relatively slow variation in the received power (comprising in particular the variation in the distance between the mobile entity and the sensing surface as well as the variation in the supply voltage of the mobile entity).

While the activation of a location module may be performed with an RFID circuit such as that illustrated in FIG. 5, there are other solutions. In particular, as described above, the activation of a location module may be linked to the comparison of an identifier received in an activation signal with an identifier stored in memory in the location module or in connection therewith.

Figure 6A:
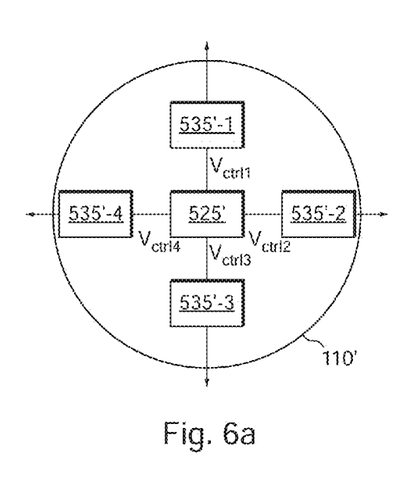
FIGS. 6a and 6b, illustrate two examples of architecture of a mobile entity comprising a location and control tag as well as mechanical parts of vibrator type.
Figure 6B:
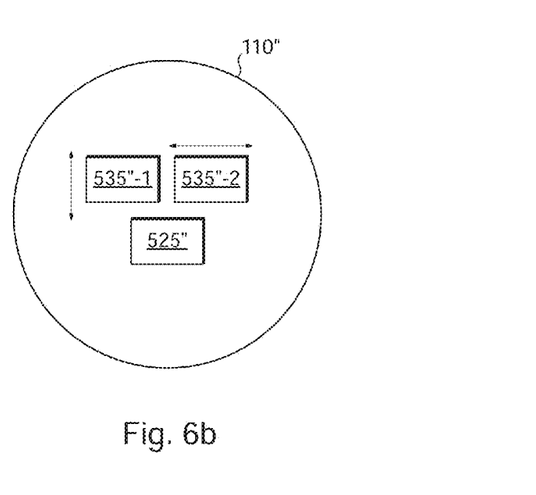

FIG. 6, comprising FIGS. 6a and 6b, illustrates two examples of architecture of a mobile entity comprising a location and control tag as well as mechanical parts of vibrator type.

More specifically, FIG. 6a represents a mobile entity 110' comprising a location and control tag 525' as well as four mechanical parts of vibrator type referenced 535'-1 to 535'-4.

In order for the center of gravity of the mobile entity 110' to be close to its geometric center, the mechanical parts 535'-1 to 535'-4 are uniformly distributed here over its periphery, the location and control tag 525" being positioned near its geometric center. Furthermore, the mechanical parts 535'-1 to 535'-4 are linked to the location and control tag 525' via variable electrical supplies Vctrl1 to Vctrl4, respectively.

Each mechanical part may generate a displacement force in at least one direction.

Thus, for example, as illustrated in FIG. 6a, the mechanical part 535'-1 may, when it receives an electric current, exert an upward displacement force. Similarly, the mechanical parts 535'-2 to 535'-4 may generate displacement forces to the right, downward and to the left, respectively, when they receive an electric current.

Naturally, according to the nature of the mechanical parts, the directions of the displacement forces created may be different. It is also possible to configure these mechanical parts in order for them to be able to generate displacement forces in two or more directions.

FIG. 6b represents a mobile entity 110" comprising a location and control tag 525" as well as only two mechanical parts of vibrator type referenced 535"-1 and 535"-2.

In this configuration, in order for the center of gravity of the mobile entity 110" to be close to its geometric center, the mechanical parts 535"-1 and 535"-2 are placed near its geometric center, like the location and control tag 525". Again, the mechanical parts 535"-1 and 535"-2 are linked to the location and control tag 525" via variable electrical supplies Vctrl1 to Vctrl2, (not shown).

Each mechanical part may generate a displacement force in at least two directions.

Thus, for example, as illustrated in FIG. 6b, the mechanical part 535"-1 may, when it receives an electric current, exert an upward or downward displacement force whereas the mechanical part 535"-2 may, when it receives an electric current, exert a displacement force to the left or to the right. The change in direction of a displacement force generated by a mechanical part may, for example, be obtained by a change in the direction of rotation of a motor.

Naturally, according to the nature of the mechanical parts, the directions of the displacement forces created may be different. It is also possible to configure these mechanical parts in order for them to be able to generate displacement forces in more than two directions.

As described above, the control of the path of a mobile entity, that is to say the automatic control of its mechanical parts, is advantageously carried out by a control driver module, preferably implementing a PID type controller, associated with the sensing surface used. According to a particular embodiment, commands are addressed to the mobile entities which have to move several tens of times per second.

Figure 7:
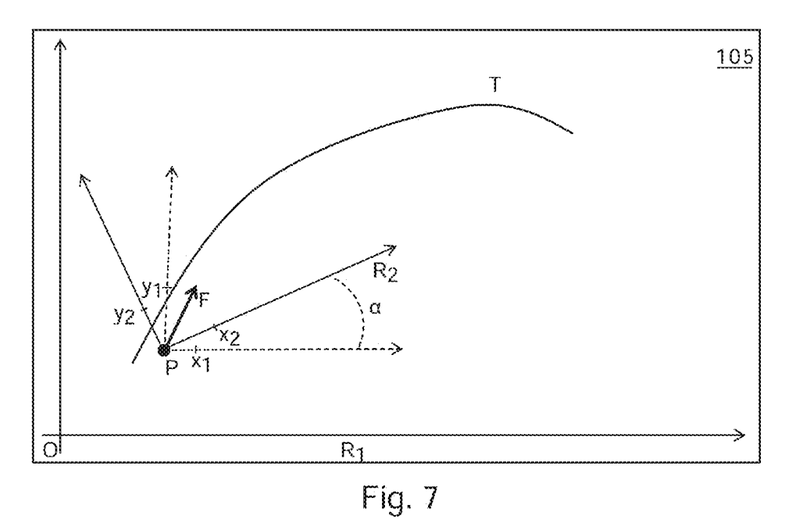
FIG. 7 illustrates an example of a path followed by a mobile entity over a sensing surface.

FIG. 7 illustrates an example of a path followed by a mobile entity over a sensing surface.

As illustrated, a mobile entity placed at a position P of a board 105 must here follow a path T which is predefined or dynamically computed by the application employing the sensing surface and one or more mobile entities.

A frame of reference $R_1(O, \vec{i}, \vec{j})$, preferably orthonormal, is associated with the sensing surface (e.g. board 105) and a frame of reference $R_2(P, \vec{u}, \vec{v})$, preferably also orthonormal, is associated with the mobile entity considered. The angle formed between the vectors $\vec{i}$ and $\vec{u}$ is denoted $\alpha$.

The mobile entity considered here generates a displacement force F having coordinates $(x_1, y_1)$ in the frame of reference $R_1$ and $(x_2, y_2)$ in the frame of reference $R_2$.

According to a particular embodiment, the sensing surface determines in real time the position P and orientation $\alpha$ (the accuracy of which determination is based on a constant) of the mobile entity considered, for example 50 times per second (cycle time of 20 milliseconds). The position P and this rotation $\alpha$ are expressed in the frame of reference $R_1$ (which frame of reference is associated with the sensing surface).

These data are transmitted to the computer system used, for example a portable computer of PC type, a smartphone or a tablet plugged into a communication port of the sensing surface.

The computer system used processes the received data in order to compare them with a given path and generate commands which are sent to the mobile entity considered in order to control its mechanical parts (typically of vibrator type).

For these purposes, the computer system runs a software module which compares the path T which the mobile object must follow, expressed in the frame of reference $R_1$, with the position P and the orientation $\alpha$, also expressed in the frame of reference $R_1$. It thus computes the error between the current position of the mobile object and the desired position on the path T.

The use of a standard automatic control algorithm enables the software module of the computer system to compute a command which is sent to the mobile entity considered and which enables a displacement force F to be generated.

As the mechanical parts used to generate a displacement force within a mobile entity are rigidly linked thereto, the coordinates of the displacement force F are, after having been computed in the frame of reference $R_1$, linked to the sensing surface $(x_1, y_1)$, expressed in the frame of reference $R_2$ linked to the mobile entity $(x_2, y_2)$ using the orientation $\alpha$ according to the following relationships:

$$x_2 = x_1 \cdot \cos(\alpha) + y_1 \cdot \sin(\alpha)$$

$$y_2 = y_1 \cdot \cos(\alpha) - x_1 \cdot \sin(\alpha)$$

Figure 8:
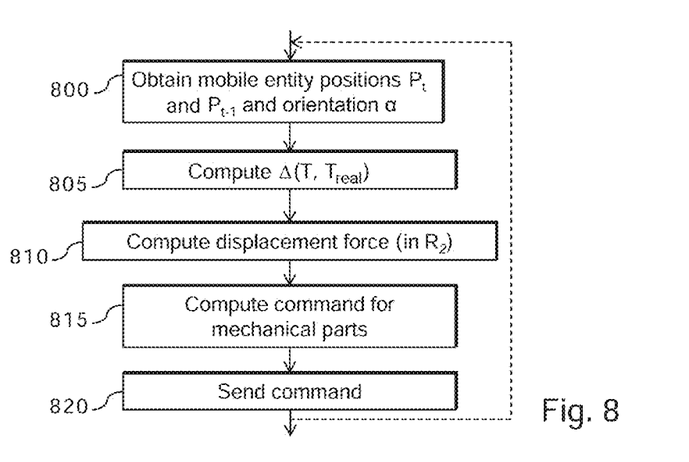
FIG. 8 diagrammatically illustrates certain steps implemented by a software module of a computer system linked to the sensing surface to control a displacement force of a mobile entity.

FIG. 8 diagrammatically illustrates certain steps implemented by a software module of a computer system linked to the sensing surface to control a displacement force of a mobile entity.

A first step (step 800) here consists of obtaining the current position $P_t$, a previous position $P_{t-1}$ and the orientation $\alpha$ of the mobile entity considered in a frame of reference linked to the sensing surface $(R_1)$. The position $P_t$ is obtained here by the activation of the mobile entity which emits an electromagnetic field as described above. It is advantageously stored in memory to be used later as previous position.

In a following step (step 805), the difference between the desired path (predetermined path or dynamically determined path) and the real path represented by the position and the variation in positions between the current time and a previous time is computed. This path difference is then used to compute (step 810) a displacement and thus a displacement force in a frame of reference linked to the mobile entity $(R_2)$, according to the orientation $\alpha$, which is used to compute (step 815) a command for the mechanical parts (e.g. vibrators) of the mobile entity using a PID type controller.

The computed command is then sent to the mobile entity to be applied to the mechanical parts (step 820).

As represented using dashed line, steps 800 to 820 are repeated as many times as is necessary.

It is observed here that although the steps described with reference to FIG. 8 are implemented here in a software module of a computer system linked to the sensing surface, they may, alternatively, be implemented at least partially, in mobile entities.

Figure 9:
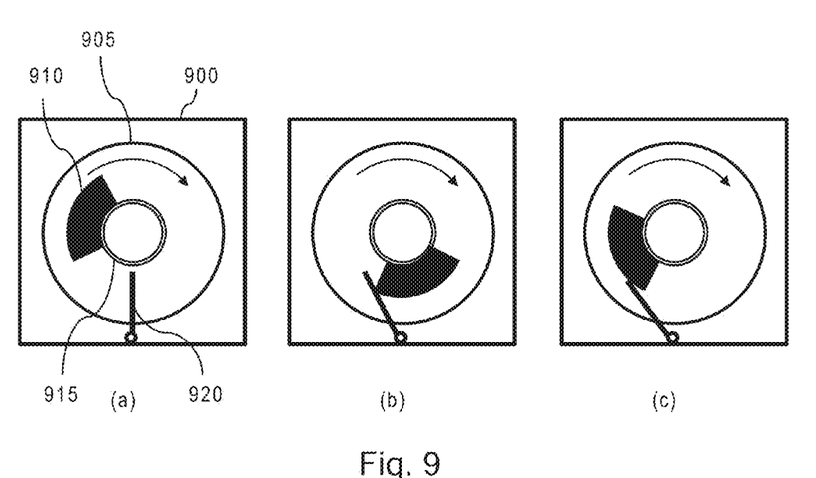

FIG. 9, comprising FIGS. 9a to 9c, represents a mechanical part of vibrator type capable of being integrated into a mobile entity and comprising a motor, an eccentric fly weight driven by the motor and an elastic and/or mobile vertical stop.

As illustrated, the mechanical part 900 comprises a motor 905 of which the rotational speed and, preferably, the direction of rotation may be controlled. A fly weight 910 is eccentrically mounted on the shaft 915 of the motor. Alternatively, the fly weight 910 may be eccentrically mounted on a shaft driven by that of the motor. The mechanical part 900 further comprises a vertical stop 920 of which one end is movably fastened to the mechanical part and the other end may be struck by the fly weight 910 when it rotates.

Alternatively, or in complementary manner, the vertical stop 920 is elastic. In this case, it may be rigidly fastened to the mechanical part 900.

Thus, an elastic and/or mobile vertical stop is placed on the path of the fly weight such that it is struck at each turn.

FIG. 9a illustrates a position of the fly weight between two impacts of the vertical stop while FIGS. 9b and 9c illustrate a position of the fly weight at the start and end of impact, respectively.

It is to be noted here that the nature and the state of the contact between the sensing surface and the mobile entity, forming a static friction force when the mobile entity is immobile relative to the sensing surface and dynamic on displacement of the mobile entity, have a direct influence on the displacement force necessary for the creation and maintenance of the movement of the mobile entity.

Thus, the instantaneous force produced at the time of the impacts of the fly weight on the vertical stop and the instantaneous force vector produced by the fly weight on the system constituted by the rest of the mobile entity (outside times of the impact of the fly weight on the vertical stop) must be determined according to the friction force (static then dynamic) between the sensing surface and the mobile entity.

To create a movement, the instantaneous force vector produced by the fly weight on the mobile entity, outside the times of impact of the fly weight on the vertical stop, along axes parallel to the contact surface, must remain less than the friction force of the mobile entity on the sensing surface while the instantaneous force produced at the time of the impacts of the fly weight on the vertical stop must exceed this friction force which opposes the movement of the mobile entity.

A torque, preferably substantially constant, is applied here by the motor on its shaft and drives the fly weight with a substantially constant acceleration. On account of the static friction forces between the mobile entity and the sensing surface, the mobile entity does not move (relative to the sensing surface) during most of the rotation of the fly weight.

Just before the impact between the fly weight and the elastic and/or mobile vertical stop, the mobile entity has stored a quantity of momentum (as indicated by the arrow in FIG. 9a) in the fly weight without the mobile entity however being displaced.

On account of the conservation of momentum of the mobile entity, the latter has a tendency to move leftward on impact of the fly weight with the elastic and/or mobile vertical stop leading to the abrupt slowing of the fly weight by the stop. If the parameters that come into play, in particular the speed of rotation of the motor, the mass of the fly weight and the resistance of the vertical stop to the impact of the fly weight, are adjusted in order for the force generated by the impact of the fly weight on the vertical stop to be greater than the static friction force, the mobile entity moves leftward.

By reversing the direction of rotation of the fly weight, the mobile entity moves rightward.

By integrating in a mobile entity several mechanical parts of vibrator type such as that described with reference to FIG. 9, preferably having rotational axes that are horizontal and perpendicular to each other, the mobile entity may be directed in any direction by modulating the relative to speed and controlling the direction of rotation of the motors.

Alternatively, or in complementary manner, the rotation of the motor may be controlled such that the positive or negative acceleration of its shaft, over a time less than that the revolution time of the motor, creates a non-zero quantity of momentum and thus a displacement force.

It is observed here that if mechanical parts such as those described with reference to FIG. 9 may be used to move a mobile entity, they may also be used to cause particular effects, for example jerks. For these purposes, it is in particular possible to use an elastic and/or movable horizontal stop. The implementation of an elastic and/or mobile oblique stop makes it possible to combine a displacement of a mobile entity with a particular effect of displacement such as jerks.

While mechanical parts of vibrator type integrated into mobile entities enable the displacement of these latter, they may also be used to generate accelerations and/or vibrations when a player attempts to hold the mobile entity in his hand.

As the position and the orientation of the mobile entity are known in real time when it is near the sensing surface, it is thus possible not only to trigger a vibration effect but also to generate an acceleration (and thus a force) in a desired direction, that is to say a haptic force directed in a particular direction based on a frame of reference linked to the sensing surface.

It is to be noted that today, joystick or control lever type devices are generally equipped with vibrators but that these are not directional. The effect produced is a simple vibration simulating, for example, the action of moving forward in a vehicle on gravel or of touching a tennis ball.

By way of example, it is assumed here that the mobile entity is used to direct a character in a 2D or 3D video game. If the character is touched by a shot in a certain direction, it is then possible to have the player feel the direction from which the shot comes.

For these purposes, a first frame of reference $R_1(O, \vec{i}, \vec{j})$, preferably orthonormal, is associated with the sensing surface (e.g. board 105) and a second frame of reference $R_2(P, \vec{u}, \vec{v})$, preferably also orthonormal, is associated with the mobile entity considered. The angle formed between the vectors $\vec{i}$ and $\vec{u}$ is denoted $\alpha$. The value of the angle $\alpha$ is obtained in real time, typically using the algorithm described above to obtain the position and the orientation of a mobile entity.

It is assumed here that the force F to be generated in the mobile entity considered has coordinates $(x_1, y_1)$ in the frame of reference $R_1$ and coordinates $(x_2, y_2)$ in the frame of reference $R_2$. The coordinates of the force F in the frame of reference $R_2$ may thus be expressed in the following form:

$$x_2 = x_1 \cdot \cos(\alpha) + y_1 \cdot \sin(\alpha)$$

$$y_2 = y_1 \cdot \cos(\alpha) - x_1 \cdot \sin(\alpha)$$

Thus, based on coordinates of the force F in the frame of reference linked to the sensing surface, determined by the application implemented in connection with the latter, it is possible to perform real-time computation of its coordinates in the frame of reference of the mobile entity. When these latter have been computed, it is necessary to perform the corresponding control of the mechanical parts of vibrator type of the mobile entity (typically comprising two or four vibrators such as those described with reference to FIG. 9). The force to be generated in the mobile entity is automatically controlled on the basis of the position of the mobile entity. For these purposes, it is computed in real time according to the position of the mobile entity.

Naturally, to satisfy specific needs, a person competent in the field of the invention will be able to apply modifications to the preceding description. In particular, although the invention may, for the purposes of illustration, be described, in particular, with reference to the RFID protocol, the invention is not limited to the implementation thereof.

The invention claimed is:

1. A device for generating and automatically controlling a displacement force of a mobile entity of which the position and the orientation are determined in real time, the device comprising:
    displacement means for generating (535) at least one displacement force, said displacement means being controllable to generate a force in several different directions;
    reception means (505, 520) for receiving a radio-frequency signal;
    emission means (515) for emitting an electromagnetic signal, said electromagnetic signal being emitted in response to an activation signal, said emitted electromagnetic signal enabling a determination of a real-time location of a mobile entity comprising said device; and
    control means (510) connected to said reception means and to said emission means, said control means being configured to
        control said displacement means to generate in response to control information from a received radio-frequency signal from a remote entity via said reception means, and
        generate the activation signal in response to synchronization information from a received radio-frequency signal from the remote entity via said reception means.

2. The device according to claim 1, wherein said displacement means comprise mechanical parts of vibrator type.

3. The device according to claim 2, wherein said mechanical parts comprise at least one motor (905) and at least one eccentric fly weight (910) which is driven, directly or indirectly, by said at least one motor.

4. The device according to claim 3, further comprising:
    at least one elastic and/or mobile stop (920), said at least one stop being mounted so as to be struck by said at least one fly weight at each revolution of said at least one fly weight.

5. The device according to claim 3, wherein said at least one motor has a rotation shaft substantially perpendicular to the plane of displacement of said device.

6. The device according to claim 1, further comprising: two or four mechanical parts of vibrator type.

7. The device according to claim 1, wherein said reception means comprise a dual-port memory, said dual-port memory being configured to be accessible for reading and/or writing by a radio-frequency signal and by said control means.

8. The device according to claim 1, wherein said reception means comprise identification means for identifying synchronization information and/or control information from a received radio-frequency signal and transmission means for transmitting identified synchronization information and/or identified control information to said control means.

9. The device according to claim 7, wherein said control means comprise means for accessing a value stored in said dual-port memory, synchronization and/or control information being identified according to a value stored in said dual-port memory.

10. The device according to claim 1, wherein said reception means are in accordance with an RFID type standard.

11. A system for automatically controlling a displacement force of a mobile entity of which the position and the orientation are determined in real time, the system comprising:
   at least one mobile entity that includes a device for generating and automatically controlling a displacement force of the mobile entity, said device comprised of
      displacement means for generating (535) at least one displacement force, said displacement means being controllable to generate a force in several different directions,
      reception means (505, 520) for receiving a radio-frequency signal,
      emission means (515) for emitting an electromagnetic signal, said electromagnetic signal being emitted in response to an activation signal, said emitted electromagnetic signal enabling a determination of a real-time location of a mobile entity comprising said device, and
      control means (510) connected to said reception means and to said emission means, said control means being configured to
         control said displacement means in response to control information from a received radio-frequency signal from a remote entity via said reception means, and
         generate the activation signal in response to synchronization information from a received radio-frequency signal from the remote entity via said reception means;
   and
   a sensing surface that includes:
      position detection driver means for sequentially activating electromagnetic emissions of mobile entities,
      location means for locating an electromagnetic signal, and
      control driver means for emitting control information for controlling said displacement means of said device of said at least one mobile entity.

12. The system according to claim 11, wherein said at least one displacement force of said device of said at least one mobile entity is determined in response to location information of said at least one mobile entity determined by said location means.

13. The system according to claim 11, wherein said control driver means comprise means for computing an error between a real path of said at least one mobile entity and a desired path of said at least one mobile entity.

14. The system according to claim 11, wherein said control driver means comprise a PID type controller.

15. The device according to claim 4, wherein said at least one motor has a rotation shaft substantially perpendicular to the plane of displacement of said device.

16. The system according to claim 12, wherein said control driver means comprise means for computing an error between a real path of said at least one mobile entity and a desired path of said at least one mobile entity.

17. The system according to claim 12, wherein said control driver means comprise a PID type controller.

18. The system according to claim 13, wherein said control driver means comprise a PID type controller.

* * * * *